United States Patent [19]

Lay et al.

[11] Patent Number: 4,851,169
[45] Date of Patent: Jul. 25, 1989

[54] ARRANGEMENT FOR REPAIRING STONE IMPACT DAMAGES AT WINDSHIELDS MADE OF MULTI-LAYER SAFETY GLASS

[75] Inventors: Kurt Lay, Rottenburg; Erwin Sailer, Altdorf, both of Fed. Rep. of Germany

[73] Assignee: Daimler-Benz Aktiengesellschaft, Stuttgart, Fed. Rep. of Germany

[21] Appl. No.: 294,685

[22] Filed: Jan. 9, 1989

Related U.S. Application Data

[62] Division of Ser. No. 23,000, Mar. 6, 1987.

[30] Foreign Application Priority Data

Mar. 8, 1986 [DE] Fed. Rep. of Germany ....... 3607738

[51] Int. Cl.⁴ ............................................. B32B 35/00
[52] U.S. Cl. ......................................... 264/36; 156/94
[58] Field of Search ............... 156/94; 264/36; 425/12

[56] References Cited

U.S. PATENT DOCUMENTS 4,280,861 7/1981 Schwartz .............................. 425/13

Primary Examiner—Bernard Nozick
Attorney, Agent, or Firm—Barnes & Thornburg

[57] ABSTRACT

A repair method for repairing stone or gravel impact damages on windshields of mult-layer safety glass, in which the damaged place is covered with a transparent suction cup, a vacuum is produced underneath the suction cup and a liquid-clear hardening synthetic resinous material is applied onto the damaged place by means of an injection needle pierced through the suction cup. Compared to known repair methods, the method of this invention requires a lesser apparatus expenditure and can be carried out in a more simple manner.

4 Claims, 1 Drawing Sheet

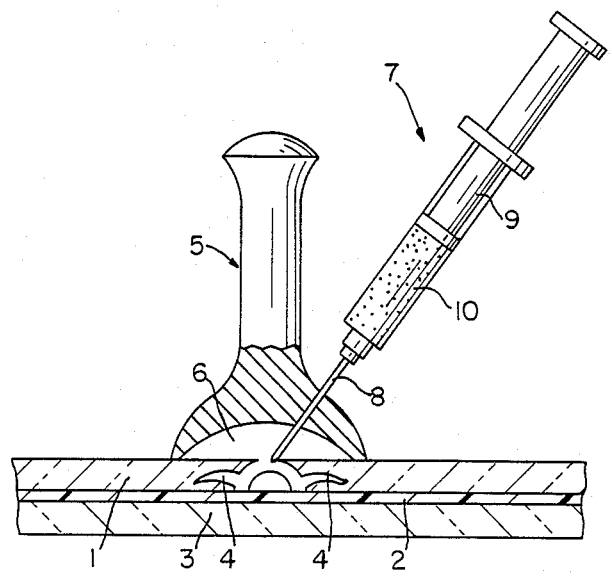

ARRANGEMENT FOR REPAIRING STONE IMPACT DAMAGES AT WINDSHIELDS MADE OF MULTI-LAYER SAFETY GLASS

This is a continuation, of application Ser. No. 023,000, filed Mar. 6, 1987.

The present invention relates to an arrangement for repairing stone or gravel impact damages on windshields made of multi-layer safety glass.

Stone or gravel impact damages at windshields of multi-layer safety glass frequently cause only damages in the uppermost glass layer whereas the plastic and glass layers disposed therebelow remain undamaged. These stone or gravel impact damages become noticeable by burstings, cracks, "small stars", etc. It is known to eliminate such damages by pressing-in under a low-viscosity transparent hardening plastic material high pressure. The plastic material thereby flows into all cracks and crevices which have resulted and fills out the same. The disturbing light refractions at the glass edges (transition of glass-air) disappear therewith. The filling of the damaged location with the plastic resinous material is assisted by a temporary generation of a vacuum in the nozzle filled with the plastic material, out of which the liquid plastic material is pressed into the damaged place. As a result of this application of a vacuum both the liquid plastic repair material as also possibly air pockets are sucked out of the damaged place. With several careful repetitions of the cycle of filling the damaged place under high pressure and subsequent application of vacuum for the removal of gas pockets or bubbles, a satisfactory filling of the repair place with the synthetic resinous material can be achieved. An arrangement suitable for this purpose is described in the U.S. Pat. No. 3,765,975. It consists of a multipartite plastic cup adapted to be pressed onto the windshield from the outside which consists of a transparent, hard material. The sealing with respect to the windshield takes place by O-rings. The plastic material is conducted to the cup by means of a piston-type injector which at the same time also serves for producing vacuum. The interior of the plastic cup is far-reachingly filled with the repair mass so that after termination of the repair, a complex and costly cleaning operation is needed. A somewhat different type of arrangement is disclosed in the U.S. Pat. No. 4,047,863. The arrangement also consists of a rigid plastic cup which is provided with a separate seal on the side of the windshield. As distinguishing feature, the cup of this patent is provided with a specially constructed separate through-passage for a broaching needle which consists of synthetic rubber. The through-passage is provided with an opening and seals in cooperation with the inserted needle matched in its thickness to the opening. As a result of its special construction, it enables a movement of the broaching needle. These prior art apparatus must be made of a large number of matched individual parts which fit accurately.

It is the object of the present invention to provide an arrangement which is considerably more simple and price-favorable and by means of which equally good repair results are attainable.

The underlying problems are solved according to the present invention in that the entire plastic cup consists of a flexible material which can be pierced by a hollow needle and thereby forms a vacuum-tight passage for the hollow needle.

The novel features of the present invention therefore consist in that the damaged place is covered off with a transparent, flexible plastic cup, a vacuum is produced underneath the plastic cup and subsequently the liquid plastic material is applied by means of a hollow needle through the flexible plastic cup onto the damaged place. The plastic cup, which one might also designate as suction cup, is to consist of transparent flexible soft plastic material or rubber and is to seal in a vacuum-ight manner about the edge of the damaged place. The intermediate space existing between suction cup and glass may be connected in one embodiment by a corresponding line with a vacuum source; however, it may also involve a closed suction cup which is placed on the windshield under pressure and which by reason of its inherent elasticity attempts to regain its original shape and thereby produces the vacuum itself as is customary with glass suction devices. This return action as a result of the inherent elasticity can also be assisted mechanically in any known manner. The transparency of the material for the plastic suction device is necessary in order to be able to position the hollow needle, by means of which the liquid plastic material is brought to the damaged place, exactly in the damage center and in order to be able to better observe the repair process (filling). For example, the hollow tubular needle of an injection device is suited as hollow needle which, after producing the vacuum, respectively, under pressure, is pierced from the outside through the plastic suction device. By reason of the inherent elasticity of the material, the pierced place remains vacuum-tight; nonetheless, the tip of the hollow needle can be moved relatively freely in the evacuated space. The liquid plastic material enters under the effect of the capillary forces and of the vacuum into the cracks, crevices and gaps of the damaged place and distributes itself thereat uniformly whereby intefering air pockets or bubbles are prevented by the applied vacuum. A pressing-in of the liquid plastic material under pressure, as is required according to the state of the art, is not necessary nor are alternate pressure and vacuum phases required. After the liquid plastic material has been applied and has filled far-reachingly the cracks, the vacuum is lifted by removal of the suction device. The air pressure which now acts on the damaged place, presses the still liquid resinous material also into the last pores of the damaged place. It is also possible under certain circumstances to permit the liquid plastic material to harden while the suction device remains in place on the windshield.

In the first instance, liquified, nearly clear, polyvinyl chloride may be used as material for the suction cup, as is utilized, for example, for the transparent suction cups customary in households. This material is particularly inexpensive. A suction cup can be re-used several times because the place pierced by the hollow needle closes again vacuum-tight after pulling out the needle owing to the inherent elasticity of the material. Preferably, the liquid plastic material is applied to the damaged place by means of a conventional injection device whose needle is pierced through the suction cup. As a result of the only slight quantities in liquid plastic material which must be applied for a repair, one is able to get by with an injection device which contains 1–5 ml liquid plastic material. The outer diameter of the injection needle thereby amounts as a rule to 0.5–1 mm. As both the suction device as also the injection device can be manufactured particularly economically as mass-produced items, respectively, are already commercially available, a one-time repair set can be made in a very inexpensive manner for carrying out the method of the present invention which consists of a suction cup to be used only once as well as of a one-way injection device with possibly non-detachably connected injection needle. The method of the present invention is particularly reliable in this manner because fresh materials are always available.

These and other objects, features and advantages of the present invention will become more apparent from the following description when taken in connection with the accompanying drawing which shows, for purposes of illustration only, one embodiment in accordance with the present invention, and wherein:

The single figure is an elevational view, partly in cross section, through an arrangement in accordance with the present invention.

The single FIGURE of the drawing illustrates a windshield consisting of an outer glass layer 1, of a plastic intermediate layer 2 and of an inner glass layer 3 in which the outer glass layer 1 has received cracks and flaws 4 by a stone or gravel impact. A suction device generally designated by reference numeral 5 is placed upon the damaged location; the suction device 5 produces a vacuum 6 at the damaged place. The hollow needle 8 (injection needle) of an injection device 7 is pierced through the material of the suction device 5 and more particularly in such a manner that the tip of the injection needle is positioned on the damaged place. By applying pressure onto the piston 9 of the injection device, the synthetic resinous material 10 is now applied through the injection needle 8 to the damaged place 4 and fills thereat the cracks, crevices and flaws. After removal of the suction device 5 and of the injection device 7 and after the hardening of the synthetic resinous material, any excess of synthetic resinous material can be removed from the outer glass layer 1, respectively, the surface of the damaged place can be matched to the surface of the outer glass layer. After polishing the surface of the damaged place which may possibly become necessary, only a hardly noticeable clouding remains. Low-viscosity liquid synthetic resins on an acrylate base are suitable in particular as low-viscosity synthetic resins which can be hardened in particular by the application of ultraviolet rays; however, the nature of the synthetic resin plays hardly a role as long as it remains sufficiently thin, i.e., of low viscosity in the non-hardened condition and remains transparent in the hardened condition. In lieu of hand-suction device, also a suction device may be used which is provided with a connection for a vacuum source.

While we have shown and described only one embodiment in accordance with the present invention, it is understood that the same is not limited thereto, but is susceptible of numerous changes and modifications as known to those skilled in the art, and we therefore do not wish to be limited to the details shown and described herein but intend to cover all such changes and modifications as are encompassed by the scope of the appended claims.

We claim:

1. A process for repairing impact damage in windshields using a transparent flexible material plastic cup means adapted to be sealingly placed on the windshield over the damage and to provide a vacuum in the intermediate space between the cup and the windshield, wherein a hollow needle means is piercingly inserted into said flexible material in a sealing relationship therewith and wherein the hollow needle means contains a plastic fill material for the impact damage which is drawn out of the hollow needle means by the vacuum in said intermediate space and which is directed to the damage by free movement of the hollow needle means in said vacuum-tight intermediate space upon viewing the hollow needle means and the impact damage through the transparent cup means.

2. The process of claim 1, wherein the hollow needle can be inserted at any point along the outer surface of said cup.

3. The process according to claim 1, wherein the plastic cup means is applied to the windshield as a suction cup.

4. The process of claim 1, wherein the hollow needle can be inserted at any point along the outer surface of said cup.

* * * * *